US006746713B2

(12) United States Patent
Schade et al.

(10) Patent No.: US 6,746,713 B2
(45) Date of Patent: Jun. 8, 2004

(54) METHOD OF MAKING INK JET RECORDING MEDIA

(75) Inventors: Robert L. Schade, Wisconsin Rapids, WI (US); Leonard J. Schliesman, Wisconsin Rapids, WI (US)

(73) Assignee: Stora Enso North America Corporation, Wisconsin Rapids, WI (US)

( * ) Notice: Subject to any disclaimer, the term of this patent is extended or adjusted under 35 U.S.C. 154(b) by 0 days.

(21) Appl. No.: 10/034,893

(22) Filed: Dec. 28, 2001

(65) Prior Publication Data

US 2002/0182379 A1 Dec. 5, 2002

Related U.S. Application Data

(63) Continuation-in-part of application No. 09/838,480, filed on Apr. 19, 2001.

(51) Int. Cl.$^7$ .............................. B05D 3/02; B05D 5/04
(52) U.S. Cl. ...................... 427/209; 427/243; 427/391; 427/395
(58) Field of Search ................ 427/243, 391, 427/209, 395

(56) References Cited

U.S. PATENT DOCUMENTS

| | | |
|---|---|---|
| 3,759,744 A | 9/1973 | Schliesman |
| 4,440,827 A | 4/1984 | Miyamoto et al. |
| 4,460,637 A | 7/1984 | Miyamoto et al. |
| 4,554,181 A | 11/1985 | Cousin et al. |
| 4,576,867 A | 3/1986 | Miyamoto |
| 4,620,197 A | 10/1986 | Miyamoto et al. |
| 4,636,409 A | 1/1987 | Arai et al. |
| 4,642,654 A | 2/1987 | Toganoh et al. |
| 4,758,461 A | 7/1988 | Akiya et al. |
| 4,877,686 A | 10/1989 | Riou et al. |
| 4,881,084 A | 11/1989 | Kan et al. ................ 346/1.1 |
| 5,041,328 A | 8/1991 | Akiya et al. |
| 5,124,201 A | 6/1992 | Kurabayashi et al. |
| 5,213,873 A | 5/1993 | Yasuda et al. |
| 5,270,103 A | 12/1993 | Oliver et al. |
| 5,302,437 A | 4/1994 | Idei et al. |
| 5,372,884 A * | 12/1994 | Abe et al. .................... 428/331 |
| 5,397,619 A | 3/1995 | Kuroyama et al. |
| 5,459,502 A | 10/1995 | Sakaki et al. |
| 5,725,946 A | 3/1998 | Fukushima et al. |
| 5,798,173 A | 8/1998 | Momma et al. |
| 5,866,268 A | 2/1999 | Sargeant et al. |
| 5,952,082 A | 9/1999 | Normington et al. |
| 5,985,424 A | 11/1999 | DeMatte et al. |
| 6,037,050 A | 3/2000 | Saito et al. |
| 6,129,785 A | 10/2000 | Schliesman et al. |
| 6,140,406 A | 10/2000 | Schliesman et al. |
| 6,165,606 A | 12/2000 | Kasahara et al. |
| 6,217,166 B1 * | 4/2001 | Saito et al. ................. 347/100 |
| 6,403,162 B1 * | 6/2002 | Tokunaga et al. ........... 427/379 |
| 6,419,987 B1 * | 7/2002 | Bauer et al. ................ 427/302 |

FOREIGN PATENT DOCUMENTS

| | | | |
|---|---|---|---|
| EP | 0493100 | 12/1991 | |
| EP | 0888904 | 6/1998 | |
| EP | 1050413 | 11/2000 | ............ B41M/5/00 |
| EP | 1127708 | 8/2001 | ............ B41M/5/00 |
| JP | 5-104848 | 4/1993 | |
| JP | 09-11608 | 1/1997 | |

* cited by examiner

*Primary Examiner*—Shrive P. Beck
*Assistant Examiner*—Kirsten Crockford Jolley
(74) *Attorney, Agent, or Firm*—Greer, Burns & Crain, Ltd.

(57) ABSTRACT

A high quality ink jet recording medium is formed of a dimensionally stable absorbent paper base sheet and a coating that is primarily a reaction product of polyvinyl alcohol and boric acid. The reaction product has molecule bonds that are principally polyvinyl alcohol-boric acid-polyvinyl alcohol bonds which, when applied to the substrate, form a three-dimensional sieve or screen-like coating facilitating penetration to the absorbent base-sheet of ink carrier vehicle and holding out on the sieve or screen the ink pigments and colorants. The coating facilitates manufacture of a high quality recording medium of exceptionally low cost, ideally suited for high-speed multicolor ink jet printing in continuous web form. Methods of making the coating and the medium are disclosed.

18 Claims, No Drawings

METHOD OF MAKING INK JET RECORDING MEDIA

CROSS-REFERENCE

This application is a continuation-in-part of co-pending application Ser. No. 09/838,480 filed Apr. 19, 2001.

FIELD OF THE INVENTION

The invention relates to high quality ink jet recording media, and to a high quality ink jet recording medium of exceptionally low cost that is ideally suited for high-speed printing, especially high-speed multi-color printing in web form.

BACKGROUND OF THE INVENTION

High quality ink jet recording media are typically made by applying a single layer of coating to a substrate, such as paper or plastic film. The coating is necessarily designed for multi-functionality, e.g., absorption for rapid penetration of ink vehicle, reactivity to hold out ink colorant at the coating surface for maximum print quality, strength for rub-resistance, and wet resistance, water fastness, fade-resistance, etc. The coating layer must be applied in an amount sufficient to provide this multi-functionality, and particularly to provide for absorbency of the ink carrier vehicle (usually water) needed for rapid drying time.

To maintain dimensional stability of the coated sheet, paper substrates for ink jet recording media typically have a basis weight of at least 35 pounds and up to 150 pounds per 3,000 square feet ream (55–236 grams per square meter). Typical coat weights are five to eight pounds per functional side per 3000 square feet ream (8–13 grams per square meter per side).

It has also been suggested, see for example U.S. Pat. Nos. 4,460,637 and 5,985,424, that the requisite functionalities might be better or more easily attained by the use of two layers of coating materials having different constituents and different characteristics for serving different purposes. U.S. Pat. No. 5,985,424 in particular proposes use of a first or base coating designed to have high absorptivity for the ink vehicle and to be compatible in performance with various ink receptive top coat formulations comprised, in this case, of various ratios of fumed silica and styrene-vinylpyrrolidone. The base coat formulation comprises pre-cipitated calcium carbonate, calcined clay and titanium dioxide dispersed in a binder comprising polyvinyl acetate and soy protein.

Whether the substrate is coated with a single layer of coating material or multiple layers of diverse coating materials, the coating is conventionally comprised of an absorptive pigment having a high void volume for absorbing the ink carrier vehicle, a binder for the pigment, frequently a hydrophylic binder such as polyvinyl alcohol (PVOH), a sizing agent, an ink holdout agent, and a cationic or con-ductive agent reactive with the ink to aid in rapid setting or fixing of the ink. Boric acid is frequently incorporated as a coagulating, gelating or hardening agent for PVOH.

U.S. Pat. No. 4,877,686, for example, discloses a coating comprised of one or more absorbent fillers dispersed in a binder comprised of fully or completely hydrolyzed poly-vinyl alcohol, and utilizing boric acid and/or its derivatives as a jelling or coagulating agent for the polyvinyl alcohol. (Air Products and Chemicals. Inc., a manufacturer of poly-vinyl alcohol (PVOH), in its U.S. Pat. No. 4,343,133, column 1, line 56 to column 2, line 18, defines "fully hydrolyzed" PVOH as being 95–99% hydrolyzed and defines "partially hydrolyzed" PVOH as being 80–95% hydrolyzed. Partially hydrolyzed PVOH actually comprises a co-polymer of polyvinyl alcohol and polyvinyl acetate.) According to the disclosure of U.S. Pat. No. 4,877.686, the boric acid may be incorporated in the base sheet, or applied as a coating to the base sheet, or incorporated in the absorbent filler/PVOH coating composition. In the latter instance, it is said that the boric acid must be deactivated before application to the substrate and reactivated upon application, inasmuch as the gelling of the binder has to take place during the coating operation and not before.

U.S. Pat. No. 4,877,686, for example, discloses a coating comprised of one or more absorbent fillers dispersed in a binder comprised of fully or completely hydrolyzed poly-vinyl alcohol, and utilizing boric acid and/or its derivatives as a jelling or coagulating agent for the polyvinyl alcohol. (Air Products and Chemicals. Inc., a manufacturer of poly-vinyl alcohol (PVOH), in its U.S. Pat. No. 4,343,133, column 1, line 56 to column 2, line 18, defines "fully hydrolyzed" PVOH as being 95–99% hydrolyzed and defines "partially hydrolyzed" PVOH as being 80–95% hydrolyzed. Partially hydrolyzed PVOH actually comprises a co-polymer of polyvinyl alcohol and polyvinyl acetate.) According to the disclosure of U.S. Pat. No. 4,877.686, the boric acid may be incorporated in the base sheet, or applied as a coating to the base sheet, or incorporated in the absorbent filler/PVOH coating composition. In the latter instance, it is said that the boric acid must be deactivated before application to the substrate and reactivated upon application, inasmuch as the gelling of the binder has to take place during the coating operation and not before.

U.S. Pat. No. 6,037,050 proposes that the boric acid be added to the filler/PVOH composition just before coating, specifically that the boric acid be added to the composition and allowed to stand at least ten minutes, preferably thirty minutes or more, before application to the substrate.

The coating compositions are said to produce very uni-form and well-shaped ink jet spots or dots.

The art has provided several ink jet recording media. However, for the most part, currently available high-quality ink jet recording media are relatively expensive, relatively slow in response time, and limited to relatively slow speed printing in sheet-fed presses and printers.

SUMMARY OF THE INVENTION

A first object of the present invention is to provide high quality ink jet recording media having an exceptionally rapid response time from ink application to ink set.

A second object of the invention is to provide high quality ink jet recording media ideally suited for high-speed printing in continuous web form and especially suited for high-speed multi-color ink jet printing.

A third object of the invention is to provide high-quality ink jet recording media at exceptionally low cost.

In accordance with the invention, a dimensionally stable and highly absorbent paper substrate or base-sheet (in web form) is coated with a composition that forms on the surface of the base-sheet a three-dimensional screen or sieve which allows rapid penetration of the ink vehicle carrier through the coating to the absorbent base-sheet while at the same time holding the ink dye or pigment out on the surface of the coated paper and facilitating rapid setting of the ink.

The three-dimensional screen or sieve that is formed on the surface of the base sheet or substrate is comprised principally of partially-hydrolyzed PVOH and boric acid that have been cooked together in an aqueous solution to achieve complete dissolution of both the PVOH and the boric acid in the aqueous solution. During the cooking process, the PVOH and boric acid begin forming a three-dimensional structure which allows only limited direct bonding of PVOH to PVOH and instead forms bonds of PVOH-boric acid-PVOH. This is in marked contrast to the prior art where boric acid acts simply as an essentially instant coagulant for the PVOH. After the PVOH/boric acid cook is complete, i.e., after both have been substantially completely dissolved in the makedown water, a glyoxal-based insolubilizer and/or other immobilizing agent is added to the solution to complete the formation of the three-dimensional structure and render the structure permanent. An ink-setting reagent, such as a cationic resin, is also added at this time. The formulation of the coating, i.e., the cook, is carried out at a controlled rate such that the polyvinyl alcohol molecules remain reasonably close to one another to impart strength and wet-resistance to the coating, but are nevertheless sufficiently spaced to facilitate penetration of the ink vehicle carrier through the porous coating and into the paper base sheet.

Even at very low coat weights, pigments, dyes and colorants do not penetrate through the coating and cause objectionable print show-through on the opposite side of the sheet. The cationic resin acts as a mordant for the dyes and pigments and fixes the colorants to the three-dimensional sieve. The medium thus has an exceptionally rapid response time between ink application and ink set.

In addition, the foregoing features of the invention permit two-sided printing even on very low basis weight papers at very low coat weights, e.g., basis weights as low as 30 pounds per 3,000 square feet ream (50 grams per square meter) and coat weights as low as 1.5 to 2.5 pounds per 3,000 square feet ream (2–4 grams per square meter) per functional side.

Consequently, both the basis weight of the base sheet and the coat weight of the coating are less than is conventional for ink jet recording media, thereby providing an exceptionally low cost ink jet print medium. Additionally, due to rapid absorption of ink carrier vehicle and rapid setting of the ink, ink jet printing on the medium may be carried out in web form on web-fed presses and printers at high speeds. In particular, multi-color printing can be performed at high web speeds, specifically, speeds greater than 200 feet per minute. The speed of printing additionally contributes to low-cost printed end-products.

The foregoing and other objects, features and advantages of the invention will become apparent to those reasonably skilled in the art from the following detailed description.

DETAILED DESCRIPTION OF PREFERRED EMBODIMENTS

The following is a detailed description of certain embodiments of the invention presently contemplated by the inventors to be the best mode of carrying out their invention.

In essence, the ink jet recording medium of the invention is comprised of a pre-treated and dimensionally stable base sheet of paper carrying a coating consisting of an aqueous solution of polyvinyl alcohol modified with three additives.

The paper base sheet or substrate may comprise any coated or uncoated absorbent paper having good formation which, when printed, will be free of fluting, cockle and mottle. Depending upon end-product characteristics, the basis weight may fall within the range of 30 to 150 pounds per 3,000 square-feet ream (40–236 grams per square meter).

For a high grade ink jet product of near-photographic print quality, the base sheet may, for example, be a high quality, high gloss, heavy-weight enamel printing paper, triple coated and supercalendered both sides, and having a basis weight of 90 to 100 pounds per 3,000 square feet ream 140–160 grams per square meter). A good example is Stora Enso North America's "CENTURA Gloss" one-hundred pound printing paper.

At the other end of the spectrum, an economy grade ink jet recording medium may utilize a paper base sheet or substrate comprising a paper made from hard wood and/or softwood chemical (Kraft) pulp and/or wood containing pulp, having a basis weight as low as 30 pounds per ream and optimally sized with rosin size and wet strength additives to enhance immediate penetration of the ink carrier vehicle or solvent (usually water) into the base sheet without incurring dimensional changes in the base sheet. A preferred range of substrate basis weights for an economy inkjet medium is from about 30 to about 60 pounds per ream (50–100 grams per square meter).

A presently preferred base sheet for an economy grade ink jet medium of high quality is made from a pulp stock or furnish comprised of an aqueous solution containing, by weight, about 50 parts softwood Kraft pulp, about 50 parts hardwood Kraft pulp, about 25 parts paper mill broke (which consists of about 80% fibers and about 20% fillers), about 0.25 to about 2.0% preferably about 0.75 to 1.5%, rosin size, such as Georgia Pacific Chemicals "Nova Plus" size, and from about 0.25 to about 1.5%, preferably about 0.5 to 0.75%, of one or more wet strength additives such, for example, as Georgia Pacific Chemicals "AMRES" PR 355 CU urea formaldehyde. A preferred additional additive is cationic starch, e.g., about 0.25% cationic starch.

Base paper properties required for good ink jet penetration include 1) high sizing to aqueous fluids, 2) wet strength, 3) high bulk, 4) good formation, and 5) high porosity. High base sizing levels and wet strength reduce penetration of aqueous fluids into the fibers, reduce fiber dimension changes, and reduce debonding between fibers. This eliminates sheet distortions in the plane of the paper when the base is rewetted with ink jet inks. High porosity and high bulk allow copious amounts of fluid to penetrate into the base sheet void areas. Good formation gives uniform penetration, which eliminates cockle when the sheet is dried. The economy sheet furnish above described provides the desired properties. Specifically, a 37 pound per ream machine glazed (MG) paper manufactured on a Yankee paper machine with this furnish has the following properties:

1) Two minute Cobb size water absorption - 30 grams
2) Wet strength - 10%
3) Bulk - 86
4) Kajaani formation - 90
5) Low pressure densitometer porosity - 10

Two-minute Cobb size is an industry standard test for determining water absorption. An acceptable range for the base paper is 25–50 grams. Wet strength is determined by dividing the machine direction (MD) tensile strength of wet paper by the machine direction tensile strength of dry paper and multiplying by 100%. An acceptable range is 8–15%. Bulk is determined by dividing the caliper (thickness) of the paper by the basis weight of the paper and multiplying by 1000. An acceptable range is 80 to 100. Kajaani formation is a well known industry test for determining the formation characteristics of paper. An acceptable range is 85 to 100, but a Kajaani formation of at least 90 is preferred for uniform ink jet receptivity and to mitigate cockle and print mottle. Low pressure densitometer porosity is also a standard test. An acceptable range is 5–25. High bulk, e.g., greater than 80, and high porosity, e.g., at least 10 seconds, ensure rapid ink carrier vehicle penetration into the base paper and very low ink dry times.

The 100% bleach chemical pulp furnish above described is best for ink jet ink applications where the final use is pressure sensitive labels. In this application, cross direction (CD) tensile strength is critical and must be high. If the end use is a business type paper, or any other end use where economy and not CD tensile is critical, mechanical pulp, groundwood pulp, semi-chemical pulp, or chemi-mechanical pulp could be used as well. However, sizing and wet strength must be maintained.

For increased hiding power, to prevent print from one side of the sheet showing through to the other side, pigment may be added to improve the opacity of the paper. Pigments such as clay, calcined clay, engineered clay, calcium carbonate, aluminum trihydrate, silicas and titanium dioxide would be satisfactory. The incorporation of groundwood or mechanical pulp will increase opacity as well. If customers require higher brightness, the addition of pigment to the base sheet and the addition of fluorescent whitening agent to the coating may prove advantageous.

Another economy grade design uses standard lightweight publication (LWC) papers as the base. These lightweight publication papers are comprised of a base paper manufactured with mechanical pulp/chemical pulp blends coated with pigmented coatings on both sides. Following coating, they are supercalendered on both sides to develop smoothness and surface gloss. These papers are typically used for magazine publishing. To manufacture ink jet grades, the substantially completed LWC papers are coated one side or both sides with ink jet receptor coatings. These grades by the nature of their manufacturing process provide high opacity and high hiding power in the final ink jet structures.

Another preferred base sheet is uncoated paper comprised in whole or substantial part of chemical pulp. Uncoated grades include forms bond, photocopy paper in sheet or roll form, and envelope stock.

A coating composition preferred for application to webs of the above described base sheet papers comprises an aqueous solution containing, on a bone-dry basis, from about 75 to about 96 parts or percent by weight of polyvinyl alcohol, from about 1 to about 6 parts or percent by weight of boric acid or a derivative thereof, such as borax (herein referred to collectively as boric acid), from about 0.25 to about 4 parts or percent by weight of an insolubilizer or immobilizer, and from about 0.5 to about 5 parts or percent by weight of an ink-setting agent, such as a cationic or conductive polymer. One or more pigments may be included as optional added constituents.

The polyvinyl alcohol or PVOH preferably employed is a low-molecular weight alcohol having a degree of hydrolysis in the order of about 89 percent, i.e., a partially hydrolyzed or saponified co-polymer of polyvinyl alcohol and polyvinyl acetate. Suitable alcohols are available from Dupont under the trade designation Elvanol and from Air Products and Chemicals, Inc., under the trade designation Airvol, particularly Airvol 805. A supplier-recommended defoaming agent is preferably employed to avoid foaming during processing and application.

The boric acid or derivative employed is a standard commercial or industrial-grade, such as "Optibor" from the Borax Company.

The insolubilizer/immobilizer is preferably glyoxal-based, e.g., either a straight glyoxal or a modified glyoxal. Glyoxal products found suitable for practice of the invention are available, for example, from Bercen Incorporated under the trade designation Berset, particularly Berset 2196 and Berset 2040 glyoxal immobilizers.

An ink-setting agent found suitable for use in practice of the invention is, among others, Conductive Resin 261LV available from Nalco Chemical Company.

One preferred formulation for the coating is comprised, by weight, of 96.25 parts Airvol 805 PVOH, 3.75 parts boric acid, 0.5 parts Berset 2040 glyoxal immobilizer, and 1.0 part 261LV polymer dispersed in water at a solids content of about twenty percent.

Application of this formulation to a wet-strength base sheet having a basis weight of 30 pounds per ream (50 grams per square meter) at coat-weights of 1.3 to 2.7 pounds per ream per side (2–4.5 grams per square meter per side) produced ink jet recording media having high-dimensional stability and excellent ink holdout, fidelity and intensity with no ink penetration to the opposite side. This base paper/coating combination provides a high-quality, low-cost, commodity-grade ink jet recording medium.

Pursuant to the invention, the boric acid is first added to the coating makedown water and completely dissolved before addition of the PVOH, after which the two are cooked together. In a presently-preferred embodiment, the makedown water is initially heated to a temperature of from about 160 to about 200 degrees F., more preferably about 180° F., while the boric acid is added to the water with mixing or stirring and allowed to dissolve for from about 1 to about 10 minutes, preferably about five minutes. The PVOH and the manufacturer's recommended defoamer are then added and the mixture heated at a temperature from about 200° F. to about 210° F., preferably about 205° F., for about 15 to about 40 minutes, preferably about thirty minutes. When the cook is complete, i.e., the boric acid and the PVOH are substantially completely dissolved, the mixture is cooled, for example, to about 120° F., decanted and stored until needed. Shelf-life of the mixture is two weeks or more.

A preferred ratio of constituents in the cook is comprised by weight of from about 70 to about 90 percent, preferably about 79 percent, make-down water, from about 10 to about 30 percent, preferably about 20 percent, PVOH, and from about 0.25 to about 2.0 percent, preferably about 0.75 percent, boric acid. The preferred ratios produce a mixture containing about 20–21 percent solids, with the solids comprised of about 96.25 percent PVOH and about 3.75 percent boric acid.

The cooked mixture above-described may be coated neat onto a web of base-sheet paper or, prior to coating, it may be and preferably is supplemented with an insolubilizer/immobilizer and/or a cationic or conductive polymer. In a presently preferred embodiment, the coating composition or formulation is comprised by weight of from about 92 to about 100 parts, preferably about 98.5 parts, of the cooked mixture, from about 0.25 to about 1.0 parts, preferably about 0.5 parts, immobilizer at 40 percent solids and from about 0.5 to about 5 parts, preferably about 1.0 parts, cationic polymer at 40 percent solids.

During the course of the cooking process, the boric acid reacts with the PVOH to form a three dimensional sieve or screen-like structure wherein the molecule bonds are principally PVOH—boric acid—PVOH bonds with only limited if any PVOH to PVOH bonds. However, the PVOH molecules remain reasonably close to one another to impart strength and wet resistance to the coating and yet are sufficiently spaced to form a porous structure facilitating penetration of the ink vehicle carrier into the absorbent paper base sheet. Addition of the immobilizer fixes the three dimensional structure and eliminates tackiness. The coating therefore acts like a sieve to strain out and hold the ink jet dyes, pigments and colorants on the surface of the paper while allowing the fluid ink carrier to rapidly penetrate into and be absorbed by the base paper. The coating composition may be applied to webs of base paper by any conventional coating process with any conventional coating equipment, e.g., film press, roll, blade or air knife.

Base-sheets of paper with a basis weight of thirty pounds per ream (48 grams per square meter) were coated on both the machine glazed (MG) side and the back side (BS) with the above-described coating composition at coat weights ranging from 1.3 to 2.5 pounds per ream (2–4 grams per square meter). The coated sheets were checked for tackiness, fingerprint resistance and water resistance, and were then printed with an image and examined for fidelity, orange peel, mottle, smearing, fingerprint resistance, water resistance and show-through. The sheets were printed on an Epson Stylus Color 800 Printer with a selected print image at 1440 dots per inch (dpi).

Based on the examinations, the papers coated with the coating composition produced excellent results. The coated papers have high water and fingerprint resistance. The printed sheets have good print intensity and fidelity, good fingerprint and adequate water resistance, and no ink penetration to the other side.

The coating produces a three-dimensional screen or sieve on the surface of the base sheet that allows the ink vehicle to penetrate through the coating to be absorbed by the base sheet, and yet is water-resistant and will not allow coffee or like spills to damage the print.

An optional added constituent for the coating is pigment. If pigment is added, its function is to improve vehicle penetration and ink drying, to increase brightness and opacity, and/or to ensure against print show-through. If used, the pigment is selected to have high affinity for the ink colorant and vehicle and/or high light scattering coefficient. Suitable pigments include clays, calcium carbonate, amorphous silicon dioxide, aluminum trihydrate, aluminum oxide and silicates.

To meet more demanding standards for even higher quality ink jet recording media, an intermediate pigmented coating may prove advantageous. The pigmented coating would preferably contain fifty percent or more by weight of calcined clay as the pigmentation, and protein and/or latex as the binder. A recommended coating is disclosed in commonly owned co-pending application Ser. No. 09/838,480, filed Apr. 19, 2001, entitled "High Gloss Ink Jet Recording Media."

With or without pigment, and with or without a pigmented intermediate coating, the coating composition of the invention produces a three-dimensional sieve or screen that adds dimensional stability to the base sheet, provides for rapid penetration there-through of the ink carrier vehicle, holds out ink colorant on the surface of the coating, permits rapid sequential applications of inks, is wet-resistant and produces a high-quality ink jet recording medium of exceptionally low cost that is especially adapted for high-speed, multi-color printing in web form.

The objects, features and advantages of the invention have thus been shown to be attained in a convenient, economical, practical and facile manner. To illustrate further, the following specific examples are given:

EXAMPLE 1

A porous high wet-strength machine glazed base paper, 37 lb./3000 ft$^2$ ream (60 gr/m$^2$), was manufactured on a Yankee paper machine. The furnish comprised 50 parts softwood kraft pulp, 50 parts hardwood kraft pulp, and 25 parts broke (comprised of 80% kraft fibers and 20% filler). The furnish also contained 1.25% of Georgia Pacific "Nova Plus" size, 0.50% of Georgia Pacific AMRES PR 355 CU wet strength resin, 0.25% cationic starch, and no additional filler or defoamer. The paper was characterized by a Cobb Size of 30 gr., 10% wet strength, 86 bulk, 90 Kajaani formation, and a low pressure densometer porosity of 10.

An ink jet receiver coating was prepared, comprising by weight 96.25 parts partially hydrolyzed Airvol 805 polyvinyl alcohol cooked in the presence of 3.75 parts boric acid at 20% solids in water. The cooking temperature was 95° C. (203° F.) After cooling, the remainder of the coating ingredients were added; specifically, to 100 bone dry parts of the cooked material was added 0.5 parts of Bercen's Berset 2040 glyoxal immobilizer, and 1.0 parts of Nalco's Conductive Resin 261 LV. Final solids was 20% in water.

The receiver coating was applied to the machine glazed base sheet on both sides in the laboratory by bench blade coater, with Coat weights applied to the MG base were 2.0–2.5 lbs. per 3000 ft$^2$ (3.3–4.2 gr/m$^2$) both sides. The coated sheets had high water and fingerprint resistance.

The sheets were printed on an Epson Stylus Color 800 printer with a selected print image at 1440 dots per inch (dpi).

The printed sheets had good print intensity and fidelity, and good fingerprint resistance and adequate water resistance after 30 seconds.

EXAMPLE 2

Samples in Example 2 were made identical to those in Example 1 except the coating immobilizer was changed—from 0.5 Berset 2040 to 5.0 parts Bayer's AGP styrene/acrylic sizing agent. The paper and print results were the same as Example 1.

EXAMPLE 3

100 lb. (150 grs./m$^2$) Centura printing paper, a wood-free Premium No. 1 sheet offset printing grade manufactured by Stora Enso North America, was used as the base for a near-photographic quality design. Standard TAPPI paper tests on this paper revealed (80–75° gloss) on both sides and 96 brightness on both sides. This "base" paper was coated 2.5–2.75 lbs./3000 ft$^2$ (4.2–4.6 gr./m$^2$) on both sides with the following formulation:

| | |
|---|---|
| 96.25 | Airvol 805 |
| 3.75 | Boric Acid |
| 0.5 | Berset 2196 |
| 1.0 | Conductive Resin 261 |

The paper and print properties were the same as the previous examples except paper brightness was much higher, 95, and paper gloss was also much higher, 80+.

EXAMPLE 4

Example 4 was identical to Example 3 except Stora Enso North America's 80 lb. wood-free FUTURA paper (120 gr./m$^2$) was used as the base. This paper has 87 TAPPI brightness and 45–75° gloss, both sides. Paper and print properties were the same as Example 3 except final brightness was about 87.

EXAMPLE 5

Example 5 was also identical to Example 3 except Stora Enso North America's 50 lb. (75 gr/m$^2$) Conso-Gloss paper, a lightweight publication grade, was used as the base. This grade contains mechanical pulp. Its brightness is 70 and its gloss is 44, both sides.

Paper and print properties were the same as Example 3 except final brightness was about 70.

While preferred embodiments of the invention have been herein described, it is to be appreciated that various changes, rearrangements and modifications may be made therein without departing from the scope of the invention as defined by the appended claims.

What is claimed is:

1. Method of making ink jet recording media comprising the steps of:

providing coating composition makedown water, adding boric acid and polyvinyl alcohol to the water, reacting the boric acid and polyvinyl alcohol to form polyvinyl alcohol-boric acid-polyvinyl alcohol bonds, and applying the composition onto an absorbent substrates said composition forming a sieve or screen facilitating penetration of ink carrier vehicle to the absorbent substrate for absorption by the substrate while holding ink pigment or colorant out on the sieve or screen.

2. A method of making ink jet recording media comprising the steps of providing coating composition makedown water, heating the water, adding boric acid to the heated water with mixing until the boric acid is substantially completely dissolved in the water, adding polyvinyl alcohol to the boric acid containing heated water and continuing to heat the water until the polyvinyl alcohol is substantially completely dissolved in the water, cooking the polyvinyl alcohol and boric acid together until a reaction has taken place between the polyvinyl alcohol and the boric acid such that the molecule bonds in the reaction product are principally polyvinyl alcohol-boric acid-polyvinyl alcohol bonds, providing a dimensionally stable absorbent paper substrate, applying a coating of the composition onto the absorbent paper substrate and forming on the substrate a three-dimensional porous screen or sieve comprised of said reaction product, the sieve or screen holding ink pigment or colorant out on the sieve or screen and facilitating penetration of ink carrier vehicle to the absorbent paper substrate for absorption by the substrate.

3. A method as set forth in claim 2 including the step of adding an immobilizer to the composition before applying the composition to the substrate.

4. A method as set forth in claim 2 wherein the substrate has a basis weight as low as 30 pounds per 3,000 square feet.

5. A method as set forth in claim 4 wherein the composition is applied to-onto the substrate at a coat weight of from about 1.3 to about 2.7 pounds per 3,000 square feet.

6. A method as set forth in claim 2 wherein said base sheet is a high gloss supercalendered paper having a basis weight on the order of about 80 to about 100 pounds per 3000 square feet.

7. A method as set forth in claim 2 wherein said base sheet is comprised of one or more of chemical, mechanical and groundwood pulps; size; and one or more wet strength additives.

8. A method as set forth in claim 7 wherein said base sheet is manufactured from a furnish comprised by weight of about 50 parts hardwood chemical pulp, about 50 parts softwood chemical pulp, about 25 parts paper machine broke, from about 0.25 to about 2 percent rosin size and from about 0.25 to about 1.5% of one or more wet strength additives.

9. A method as set forth in claim 8 wherein the furnish includes on the order of about 0.25 percent by weight cationic agent.

10. A method as set forth in claim 2 further comprising adding an ink setting agent to the coating composition before applying the composition to the substrate.

11. A method of making ink jet recording media comprising the steps of:

providing coating composition makedown water, heating the water, adding boric acid to the heated water, mixing until the boric acid is substantially completely dissolved in the water, adding polyvinyl alcohol to the boric acid containing heated water, continuing heating the water until the polyvinyl alcohol is substantially completely dissolved in the water, cooking the polyvinyl alcohol and boric acid together until a reaction has taken place between the polyvinyl alcohol and the boric acid such that the molecule bonds in the reaction product are principally polyvinyl alcohol-boric acid-polyvinyl alcohol bonds, adding an immobilizer, providing a dimensionally stable absorbent substrate, and applying a coating of the composition onto the absorbent substrate, said coating comprising a sieve or screen facilitating penetration of ink carrier vehicle to the absorbent substrate for absorption by the substrate while holding ink pigment or colorant out on the sieve or screen.

12. A method as set forth in claim 11 including the step of adding a cationic or conductive polymer to the coating composition.

13. A method as set forth in claim 11 wherein said coating is comprised of from about 75 to about 96 parts by weight polyvinyl alcohol and from about 1 to about 6 parts by weight boric acid.

14. A method as set forth in claim 11 wherein the immobilizer is glyoxal-based.

15. A method as set forth in claim 11 wherein the makedown water comprises from about 70 to about 90 percent by weight of the composition, the boric acid comprises from about 0.25 to about 2.0 percent by weight of the composition, and the polyvinyl alcohol comprises from about 10 to about 30 percent by weight of the composition.

16. A method as set forth in claim 11 wherein the substrate has a basis weight of from about 30 pounds to about 150 pounds per 3000 square feet.

17. A method as set forth in claim 11 wherein said coating has a coat weight of from about 1.3 to about 2.7 pounds per 3,000 square feet.

18. A method as set forth in claim 11 wherein said substrate is selected from the group of uncoated paper, coated paper, high gloss printing paper, groundwood paper, paper made from chemical pulp, paper containing wet strength additives, machine glazed paper, label paper, light weight publication grade paper, supercalendared paper, bond, photography paper, and envelope stock.

* * * * *

UNITED STATES PATENT AND TRADEMARK OFFICE
CERTIFICATE OF CORRECTION

PATENT NO. : 6,746,713 B2
DATED : June 8, 2004
INVENTOR(S) : Schade et al.

Page 1 of 1

It is certified that error appears in the above-identified patent and that said Letters Patent is hereby corrected as shown below:

Column 2,
Lines 10-28, delete "U.S. Patent No. 4,877,686, for example, discloses a coating comprised of one or more absorbent fillers dispersed in a binder comprised of fully or completely hydrolyzed polyvinyl alcohol, and utilizing boric acid and/or its derivatives as a jelling or coagulating agent for the polyvinyl alcohol. (Air Products and Chemicals, Inc., a manufacturer of polyvinyl alcohol (PVOH), in its U.S. Patent NO. 4,343,133, column 1, line 56 to column 2, line 18, defines "fully hydrolyzed" PVOH as being 95-99% hydrolyzed and defines "partially hydrolyzed" PVOH as being 80-95% hydrolyzed. Partially hydrolyzed PVOH actually comprises a co-polymer of polyvinyl alcohol and polyvinyl acetate.) According to the disclosure of Patent 4,877,686, the boric acid may be incorporated in the base sheet, or applied as a coating to the base sheet, or incorporated in the absorbent filler/PVOH coating composition. In the latter instance, it is said that the boric acid must be deactivated before application to the substrate and reactivated upon application, inasmuch as the gelling of the binder has to take place during the coating operation and not before.".

Column 9,
Line 10, delete "substrates" and insert -- substrate --.
Line 46, delete "to-".

Signed and Sealed this

Twenty-fifth Day of April, 2006

JON W. DUDAS
*Director of the United States Patent and Trademark Office*